Aug. 11, 1925.
W. W. EDWARDS
BAND SAW GUIDE
Filed July 18, 1921
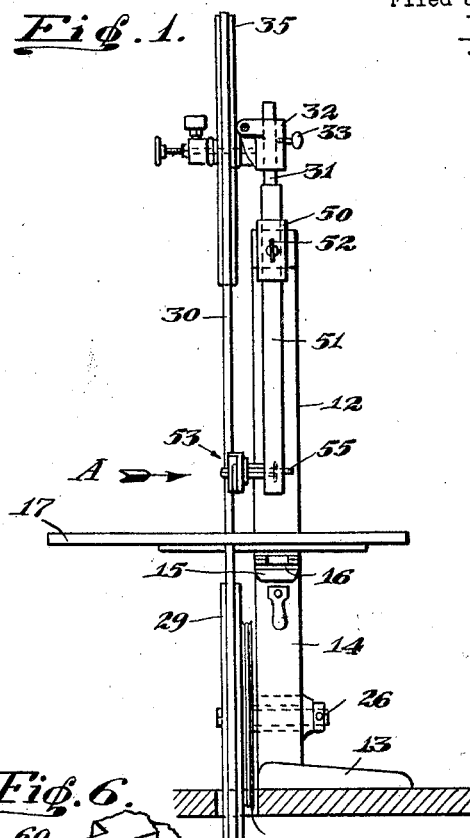
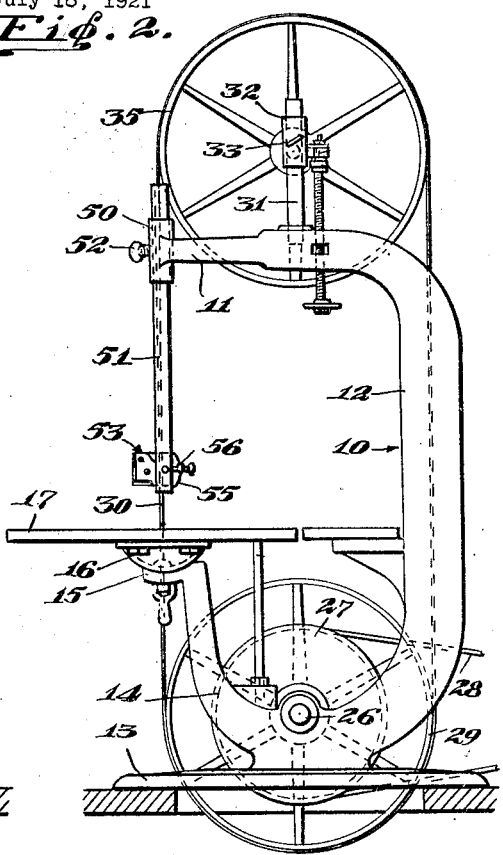
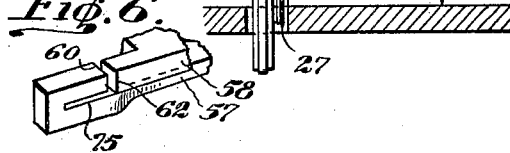
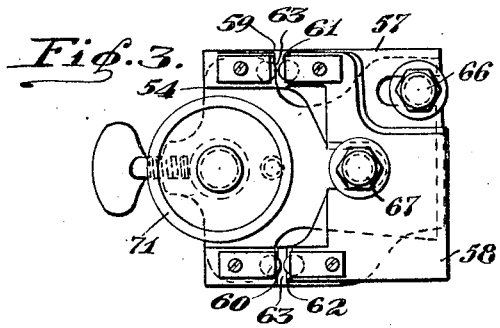
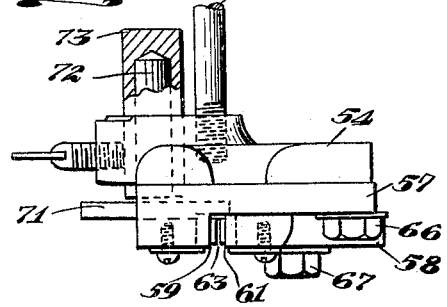
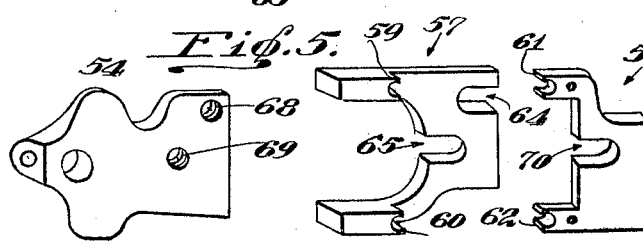
INVENTOR.
William W. Edwards,
BY
R. S. Berry
ATTORNEY Patented Aug. 11, 1925.

1,549,407

UNITED STATES PATENT OFFICE.

WILLIAM W. EDWARDS, OF LOS ANGELES, CALIFORNIA.

BAND-SAW GUIDE.

Application filed July 18, 1921. Serial No. 485,566.

*To all whom it may concern:*

Be it known that I, WILLIAM W. EDWARDS, a citizen of the United States, residing at Los Angeles, in the county of Los Angeles and State of California, have invented new and useful Improvements in Band-Saw Guides, of which the following is a specification.

My present invention particularly pertains to guides for band saws, and an object of my invention is to provide a saw guide which is so constructed that it may be readily adjusted to properly align with the saw blade and which will obviate any possible binding of the blade in the guide.

With the foregoing object in view as well as such other objects and advantages as may subsequently appear, my invention consists in certain novel features of construction and arrangement of parts as will be hereinafter described and claimed, and illustrated in the accompanying drawings, in which:—

Figure 1 is a view of the band saw as seen in end elevation.

Figure 2 is a view seen in rear elevation.

Figure 3 is a detail in front elevation of the saw guide as seen in the direction of the arrow A in Figure 1.

Figure 4 is a plan view of the saw guide shown in Figure 3.

Figure 5 is a view in perspective showing the parts of the saw guide unassembled.

Figure 6 is a detail in perspective illustrating the saw guide as formed without non-friction rollers.

More specifically, 10 indicates a frame which may be of any suitable construction and is here shown as comprising a bracket 11 formed on a column 12 carried on a base 13, and a standard 14 formed integral with the column and base and projecting upwardly from the latter beneath the outer end portion of the bracket 11 and terminating in spaced relation thereto. The upper end of the standard 14 terminates in a bracket 15 having a concave upper face in which is seated for adjustment an arcuate shoe 16 carrying a table 17.

Mounted in a suitable bearing between the column 12 and standard 14 is a counter shaft 26 carrying a belt wheel 27 around which is driving belt 28 is passed, and also carried on the counter shaft is a wheel 29 around which the lower portion of a band saw 30 is passed, as is common in band saw mountings. Projecting upwardly from the bracket 11 is a square post 31 on which is mounted a vertically adjustable sleeve 32 fitted with a thumb screw 33 adapted to engage the post to hold the sleeve against movement on the post, and carried by the sleeve 32 is a spindle 34 on which is mounted a wheel 35 around which the upper portion of the band saw 30 is passed.

The outer end of the bracket 11 is formed with a sleeve 50, in which is mounted for vertical adjustment a rectangular bar 51; a set screw 52 being screwed in the sleeve 50 to engage the bar and hold the latter against movement. Mounted on the lower end of the bar 51 is a saw guide 53, the construction of which constitutes an important feature of my invention. This saw guide is particularly shown in Figures 3, 4, and 5, and includes a back plate 54 carried on a shank 55, which projects horizontally from the rear face of the back plate and is mounted for longitudinal adjustment on the bar 51, which bar is fitted with a thumb screw 56 for engaging the shank 55 to hold it against movement. The outer or front face of the back plate 54 is flat and adjustably mounted thereon is a pair of slide blocks 57 and 58, the block 57 being adapted to seat on the front face of the back plate and being formed with a flat outer face from which projects a pair of vertically aligned shoulders 59 and 60 arranged to project on one side of the saw blade 30, and the block 58 being adapted to seat on the front face of the block 57 and being formed with aligned shoulders 61 and 62 on one end thereof arranged to face the shoulders 59 and 60 on the block 57 and adapted to extend on the opposite side of the saw blade. The shoulders 59—60 and 61—62 may be fitted with non-friction rollers 63 to bear on opposite sides of the saw blade if so desired. The block 57 is formed with oppositely extending and offset open ended horizontal slots 64 and 65 adapted to receive bolts 66 and 67 screwed into threaded openings 68 and 69 in the back plate, and the block 58 is formed with an open ended horizontal slot 70 to receive the bolt 67; the slots 65 and 70 extending on a plane intermediate the spaced shoulders on the blocks 57 and 58, respectively and opening in like direction. The blocks 57 and 58 are thus adjustable longitudinally relative to the back plate and to each other so that the shoulders thereon may be disposed in proper alignment with the saw blade 30, and so that either or both of the blocks may be adjusted to compensate for wear, particularly where rollers 63 are dispensed with and the saw blade guided solely by the guide shoulders as in the construction shown in Figure 5.

Mounted on the back plate 54 and extending in front of the outer face thereof and parallel therewith is a wheel 71 against the front face of which the back edge of a saw blade is adapted to abut, as is common in band saw guide construction; the wheel being so arranged that a portion thereof adjacent its periphery will extend back of the portion of the saw blade extending between the spaced shoulders of the blocks 57 and 58. The wheel 71 is here shown as carried on a stem 72 revolvably mounted in a bearing 73 carried by the back plate 54.

In the application and operation of the invention the saw guide is adjusted vertically to position it at the desired horizontal plane by shifting the bar 51 in the sleeve 50, and the saw guide is adjusted horizontally to bring the vertical outer face of the wheel 71 against the rear edge of the saw blade by shifting the shank 55 longitudinally in its mounting on the bar 51. In thus initially positioning the saw guide in relation to the saw blade the bolts 66 and 67 are loosened, the guide blocks 57 and 58 are shifted in opposite directions relatively to each other so as to space the shoulders 59 and 60 of the block 57 and the shoulders 61 and 62 on the block 58 such distance apart as to readily permit positioning of the saw blade therebetween, whereupon the block 57 may be quickly shifted horizontally to bring the guide shoulders 59 and 60 or the rollers 63 thereon into proper contact with one side of the saw blade. On this being accomplished the bolt 66 is tightened to clamp the guide block 57 against movement on the back plate 54. The outer guide block 58 may then be quickly shifted horizontally to position the shoulders 61 and 62 thereof or the rollers 63 carried thereby in proper contact with the opposite side of the saw blade, whereupon the bolt 67 is tightened to securely clamp the block 58 against the block 57 and at the same time more securely clamp the block 57 against the block plate 54. In like manner the blocks 57 and 58 may be adjusted relatively to each other and to the back plate to compensate for wear of the saw guide as well as for positioning the guide slots between the adjacent shoulders in proper relation to the saw blade.

By thus mounting the guide blocks 57 and 58 adjustment thereof may be easily and quickly effected and the parts may be readily assembled, and removed and replaced, as only two screws or bolts 66 and 67 are necessarily employed in attaching the two shiftable guide blocks 57 and 58 to the back plate 54 and in effecting clamping of the side blocks against movement relatively to each other.

By the construction shown the guides on the opposite sides of the saw blade may be separately shifted, that is, the side of the guide way formed by the shoulders 59 and 60 may be adjusted to the desired position, whereupon the side of the guide way formed by the shoulders 61 and 62 may be adjusted independent of the shoulders 59 and 60 whereby the distance between the shoulders 59 and 61, and 60 and 62 forming the opposite sides of the guide way may be varied as occasion requires. Furthermore, by this construction the guide way as a whole may be shifted horizontally with relation to the supporting back plate 54. These various adjustments being accomplished by the use of only two clamp screws or bolts the construction and operation of the device is rendered extremely simple.

Where the shoulders on the members 57 and 58 are constructed without non-friction rollers, as shown in Figure 6, a kerf 75 is formed at the juncture of the shoulder with the top face of the member 57 in continuation of the surface of the latter to insure even wear of the shoulder.

I claim:

1. A band saw guide comprising, a back plate, and a pair of guide blocks mounted in superimposed relation on said back plate for adjustment relative to the back plate and to each other, means for clamping one of the guide blocks against the back plate independent of the other, and separate means for clamping the pair of guide blocks collectively to the back plate.

2. A band saw guide comprising, a block having a pair of spaced shoulders adapted to extend along one side of a band saw blade, a second block mounted in superimposed relation to the first named block having a pair of spaced shoulders adapted to extend alongside the other side of a band saw blade, a mounting for said blocks, and means whereby said blocks may be adjusted to advance or retract the shoulders thereon relative to the saw blade, and means for clamping said guide blocks collectively to said back plate.

3. A band saw guide comprising, a block having a pair of spaced shoulders adapted to extend along one side of a band saw blade, a second block mounted in superimposed relation to the first named block having a pair of spaced shoulders adapted to extend alongside the other side of a band saw blade, a mounting for said blocks, means whereby said blocks may be independently adjusted to advance or retract the shoulders thereon relative to the saw blade, means for clamping said saw guide blocks collectively on said mounting, and non-friction rollers mounted in said shoulders adapted to bear against the sides of the saw blade.

4. A band saw guide comprising, a back plate, a bolt screwed in said back plate, a pair of separable blocks mounted in superimposed relation having slots engaged by said bolt adapted to be shifted relative to each other and to the back plate and to be clamped collectively to the back plate by said bolt; each of said blocks having a pair of spaced shoulders with the shoulders on one block arranged opposite the shoulders on the other block forming a guide slot.

5. A band saw guide comprising, a back plate, a bolt screwed in said back plate, a pair of separable blocks mounted in superimposed relation having slots engaged by said bolt adapted to be shifted relative to each other and to the back plate and to be clamped collectively to the back plate by said bolt; each of said blocks having a pair of spaced shoulders with the shoulders on one block arranged opposite the shoulders on the other block forming a guide slot, and a second bolt screwed in said back plate engageable with one of said blocks whereby it may be clamped to the back plate independent of the other block.

WILLIAM W. EDWARDS.